Figure 1:
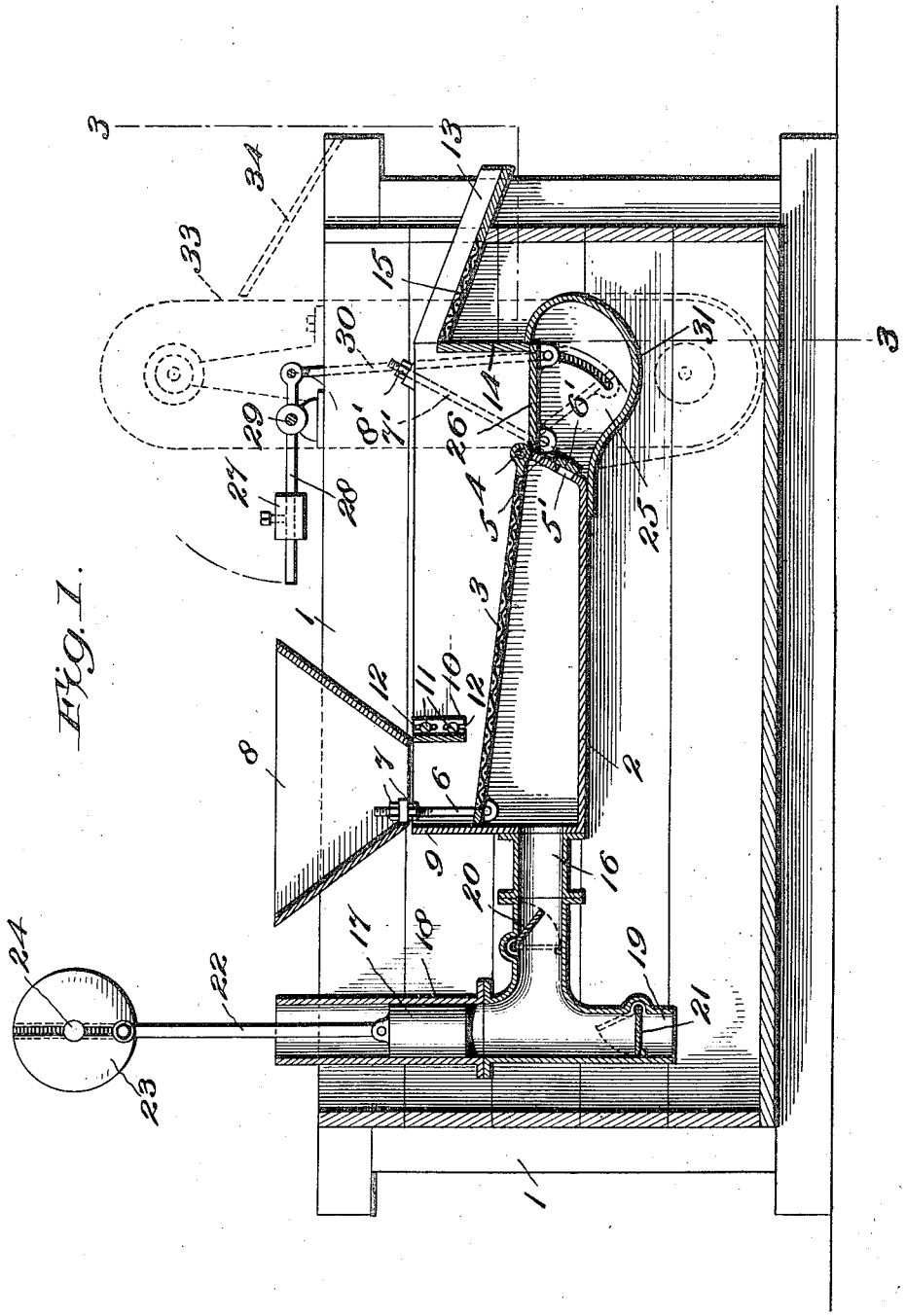

C. E. CHRIST.
SEPARATING AND WASHING APPARATUS.
APPLICATION FILED JAN. 25, 1911.

999,545.

Patented Aug. 1, 1911.
3 SHEETS—SHEET 1.

Witnesses

Inventor
C. E. Christ.

C. E. CHRIST.
SEPARATING AND WASHING APPARATUS.
APPLICATION FILED JAN. 25, 1911.
999,545.
Patented Aug. 1, 1911.
3 SHEETS—SHEET 2.
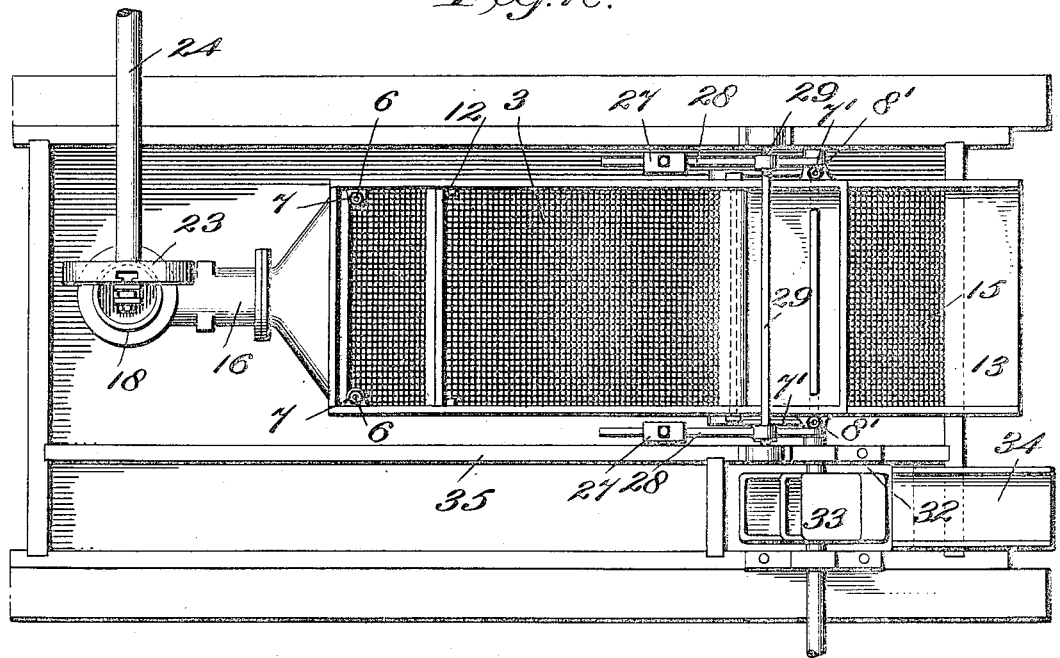
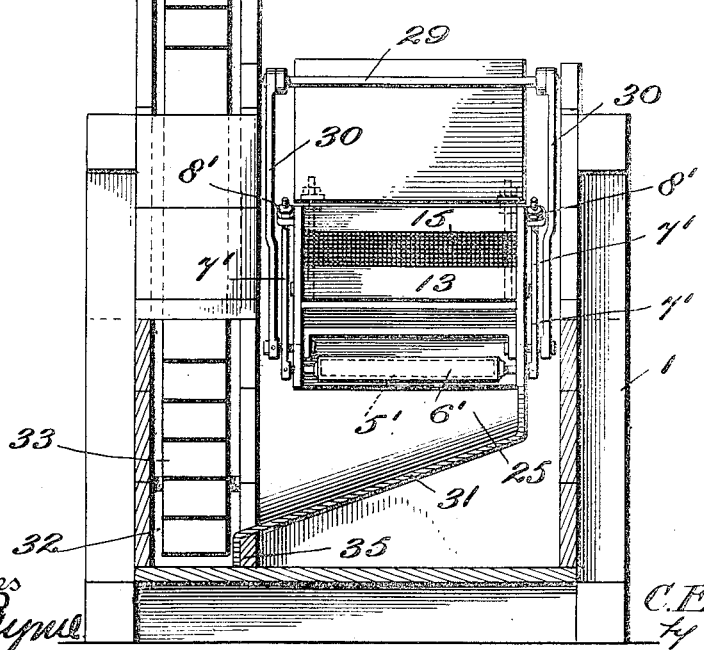

C. E. CHRIST.
SEPARATING AND WASHING APPARATUS.
APPLICATION FILED JAN. 25, 1911.
999,545.
Patented Aug. 1, 1911.
3 SHEETS—SHEET 3.
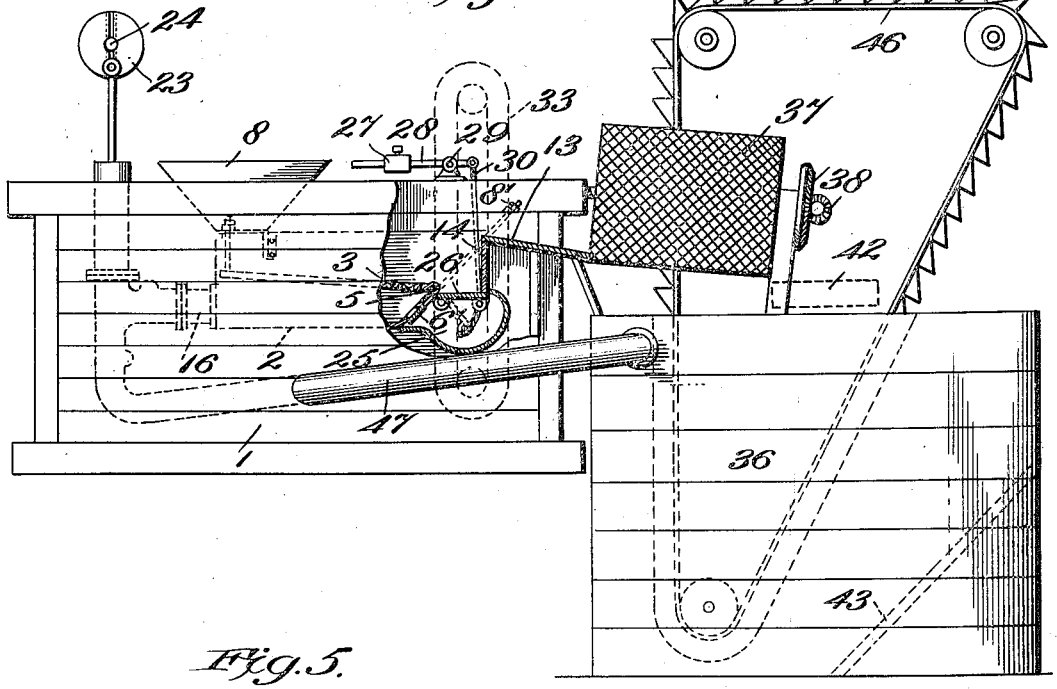
Fig. 4.
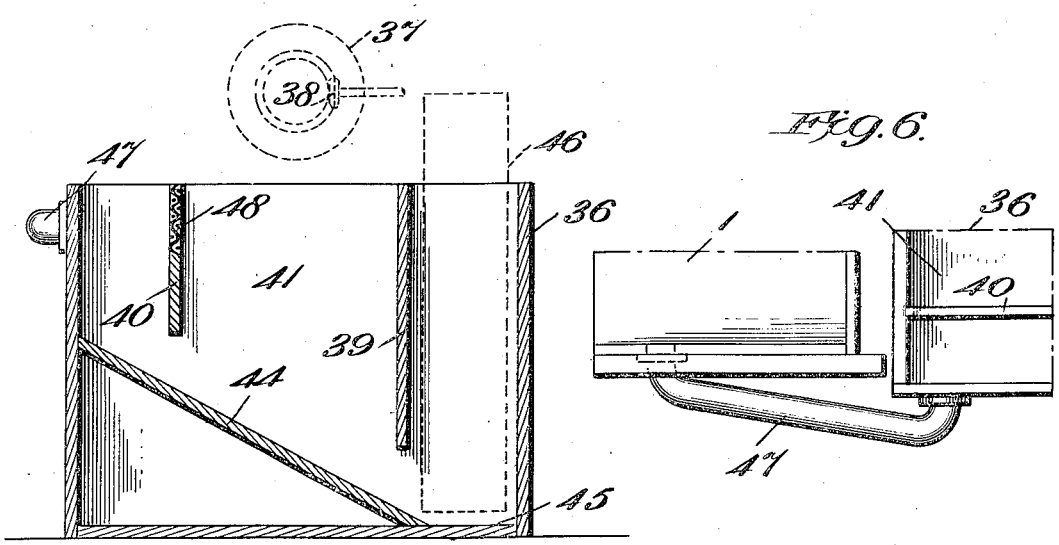
Fig. 5.
Fig. 6.
Witnesses
Geo. A. Byrne.
H. H. Byrne.
Inventor
C. E. Christ,
by
Wilkinson, Fisher Witherspoon
Attorneys

UNITED STATES PATENT OFFICE.

CHARLES E. CHRIST, OF TAMAQUA, PENNSYLVANIA.

SEPARATING AND WASHING APPARATUS.

999,545.

Specification of Letters Patent. Patented Aug. 1, 1911.

Application filed January 25, 1911. Serial No. 604,698.

*To all whom it may concern:*

Be it known that I, CHARLES E. CHRIST, a citizen of the United States, residing at Tamaqua, in the county of Schuylkill and State of Pennsylvania, have invented certain new and useful Improvements in Separating and Washing Apparatus; and I do hereby declare the following to be a full, clear, and exact description of the invention, such as will enable others skilled in the art to which it appertains to make and use the same.

The present invention relates to a washing and jigging, or separating apparatus, having for its purpose to provide a machine of simple construction, which will perform the separating and washing operation without undue loss of fine materials, and avoid excessive breakage of the product to be recovered.

The invention further contemplates an apparatus requiring but a comparatively small amount of water; and one necessitating the minimum amount of attention to secure an efficient operation of the apparatus.

With these objects in view the invention consists in the novel details of construction and combinations of parts more fully hereinafter disclosed and particularly pointed out in the claims.

The apparatus is shown by way of illustration in the accompanying drawings, wherein—

Figure 1 is a longitudinal sectional view thereof. Fig. 2 is a top plan view of the same. Fig. 3 is a transverse sectional view of Fig. 1 taken on the line 3—3. Fig. 4 is a side elevation, partly broken away, of the apparatus assembled with a second separator. Fig. 5 is a transverse sectional view of Fig. 4, and Fig. 6 is a top plan view, in diagram, of parts shown in Fig. 4.

Referring to the several figures in detail and with like reference characters indicating the same parts in the different views, 1 designates a container or tank for the washing fluid and mounted within which is a jig pan or receptacle 2. The receptacle 2 is provided with a perforated partition or screen 3 hinged at 4 to the end wall 5 thereof. Said partition is disposed on an incline and is supported through the medium of adjustable hangers 6 whereby the degree of inclination of the screen may be varied for obvious reasons. Any adjustment of the partition 3 may be maintained by the locking nuts 7 which have screw-threaded engagement with the hanger bars 6.

Disposed above the receptacle 2 and adjacent one end thereof is a hopper 8 for feeding the material to be separated on to the screen 3, such material being first deposited within a distributing chamber provided by the end wall 9 of the receptacle 2 and a brake 10. The brake 10 is adjustably mounted by bolts and slots 11, 12 for the purpose of regulating the distribution of material to the partition 3. At its rear end the receptacle 2 is provided with a chute 13 extending off from the end wall 14, and that portion of the chute 15, which lies between the tank and the wall 14, is perforated to permit of drainage, into the tank 1, of the overflow liquid, as will be understood.

Communicating with the lower chamber of the receptacle 2 is a pipe 16 leading from a reciprocating or pulsating pump 17, 18 which causes the washing liquid in the tank 1 to be taken through the inlet pipe 19 and forced through the pipe 16 into the receptacle 2. The pipes 16 and 19 are provided respectively with check valves 20 and 21. The piston 17 of the pump derives movement from a pitman 22 connected with a crank disk 23, said disk being in turn rotated from the shaft 24. The connection between the pitman 22 and the crank disk 23 is such (see Fig. 1) that the length of stroke of the piston 17 may be varied.

The washing fluid which is taken through the pipe 19 and forced into the lower receptacle chamber passes through the perforated partition 3, and then percolates through the material supported thereon, and the resultant wash overflowing from the receptacle 2, passes off through the chute 13. Such material as is carried by this overflow passes off at the chute end while the water is returned to the tank 1 through the perforated section 15. Such material as is collected on the partition 3 is adapted to be periodically delivered into a receiver 25, and to this end said receiver is provided with a gravity actuated door 26 which normally shuts off communication between said receiver and the upper receptacle chamber. The door 26 is maintained closed through the medium of weighted levers 27, 28, journaled on a shaft 29, and connecting rods 30. When an accumulation of washed material on the door 26 is sufficient to overcome the counter-balancing weights 27, said door is automatically opened and such material is then admitted into the receiver 25 when the door closes. The material accumulated within the lower receptacle chamber may be removed through an opening 5' in the wall 5, said opening being normally closed by a door 6' which is supported and operated by adjustable bars 7' having setting nuts 8'.

The product which is collected within the receiver 25 is, by the inclined receiver bottom 31, directed into a chamber 32 from where it is carried by a suitable conveyer 33 to a chute 34. The receiving or feeding chamber 32 and the carrier 33 are isolated from the liquid contained in the tank 1 by a partition 35 which divides said tank longitudinally (see Fig. 2).

For use in washing bituminous coals, especially fine or slack coal, it is proposed to use the described apparatus in connection with a second separator. In this connection the apparatus is shown assembled in Fig. 4 and comprises a "sludge" tank 36 having supported thereon and, adjacent the first separator overflow 13, a rotary and separating screen 37 connected to be driven through a suitable gearing 38. Instead of a rotary screen a shaking screen may be employed.

The tank 36 has relatively deep and shallow partitions 39 and 40 that are open at the lower ends to bring the several divisions of said tank into communication. The screen 37 is located to deliver this screened material into the chamber 41 between the walls 39 and 40; such particles as will not pass through the mesh of the screen are deposited onto a suitable conveyer, such as shown diagrammatically at 42 in Fig. 4. The product deposited within the chamber 41 is, by the inclined floors 43, 44, directed to the chamber 45 from where it is carried off by a suitable conveyer 46. The water delivered into the chamber 41 is returned to the pump 17, 18 by a pipe 47. The screen 48 within the partition 40 prevents the passage to the pipe 47 of any solid particles of material.

When the apparatus disclosed in Fig. 1 is used in the above described connection the overflow 13 is not provided with a screen (15) for the return of the washing liquid into the tank 1, since the entire overflow from the receptacle 2 is designed to be passed to the rotating screen 37. And in the arrangement shown in Fig. 4 the washing fluid from the tank 16 is returned direct to the pump supply pipe 19, but does not enter the container 1. In fact the container 1 may for this reason be omitted altogether.

It will be understood, of course, that such other slight changes as would operate to the betterment of the apparatus may be resorted to without departing from the spirit of the invention.

What is claimed is:—

1. In a separating apparatus, a jig comprising a receptacle, a receiver connected with the receptacle, a wall of said receptacle providing a partition between the receptacle and receiver chambers, a screen for said receptacle hinged on said partition for vertical adjustment, and an automatically actuated door for the receiver hinged on said partition, substantially as described.

2. In a separating apparatus, a jig comprising a receptacle, a receiver connected with the receptacle, a wall of said receptacle providing a partition between the receptacle and receiver chambers, means associated with said wall for effecting communication between said chambers, a screen for said receptacle hinged to said partitioning wall, means for adjustably positioning said screen, and an automatically actuated door for said receiver hinged to said partitioning wall, substantially as described.

In testimony whereof, I affix my signature, in presence of two witnesses.

CHARLES E. CHRIST.

Witnesses:
A. B. NEAL,
CHARLES S. SHINDEL.